(12) United States Patent
Barr

(10) Patent No.: US 7,542,814 B2
(45) Date of Patent: Jun. 2, 2009

(54) HOME ENTERTAINMENT APPARATUS AND METHOD

(76) Inventor: Craig Barr, 2925 Alta Ter., La Cresenta, CA (US) 91214

( * ) Notice: Subject to any disclaimer, the term of this patent is extended or adjusted under 35 U.S.C. 154(b) by 923 days.

(21) Appl. No.: 10/860,356

(22) Filed: Jun. 1, 2004

(65) Prior Publication Data
US 2005/0278764 A1    Dec. 15, 2005

(51) Int. Cl.
*G06F 17/00* (2006.01)
*H04B 1/00* (2006.01)
(52) U.S. Cl. .................................. 700/94; 381/119
(58) Field of Classification Search ............... 700/94; 381/119; 725/40, 41, 49, 139; 369/1–12
See application file for complete search history.

(56) References Cited

U.S. PATENT DOCUMENTS

2003/0231205 A1 * 12/2003 Shima et al. ............... 345/744
2004/0117825 A1 * 6/2004 Watkins ....................... 725/40

* cited by examiner

*Primary Examiner*—Curtis Kuntz
*Assistant Examiner*—Andrew C Flanders
(74) *Attorney, Agent, or Firm*—T. L. Miller

(57) ABSTRACT

A home entertainment system or home theater includes an audio/visual program source with a stereo or surround sound system. An apparatus and method according to the present invention adds supplemental audio content to live or pre-recorded events, such as football games, baseball games, and other sporting events in a spontaneous dynamic environment promoting group participation and enthusiasm. Random access to the supplemental audio content instantaneously and by remote control affords a user of the apparatus an opportunity to creatively add to the viewing experience at home. Additional treatment of the supplemental audio content is effected so that home viewers of the event perceive a seamless audio content including the supplemental audio. Audio effects, such as a simulation of the reverberation of a stadium or large hall, can also be added to further increase the sensation of attending a live sporting event.

21 Claims, 19 Drawing Sheets

HOME ENTERTAINMENT APPARATUS AND METHOD

BACKGROUND OF THE INVENTION

1. Field of the Invention

Figure 1:
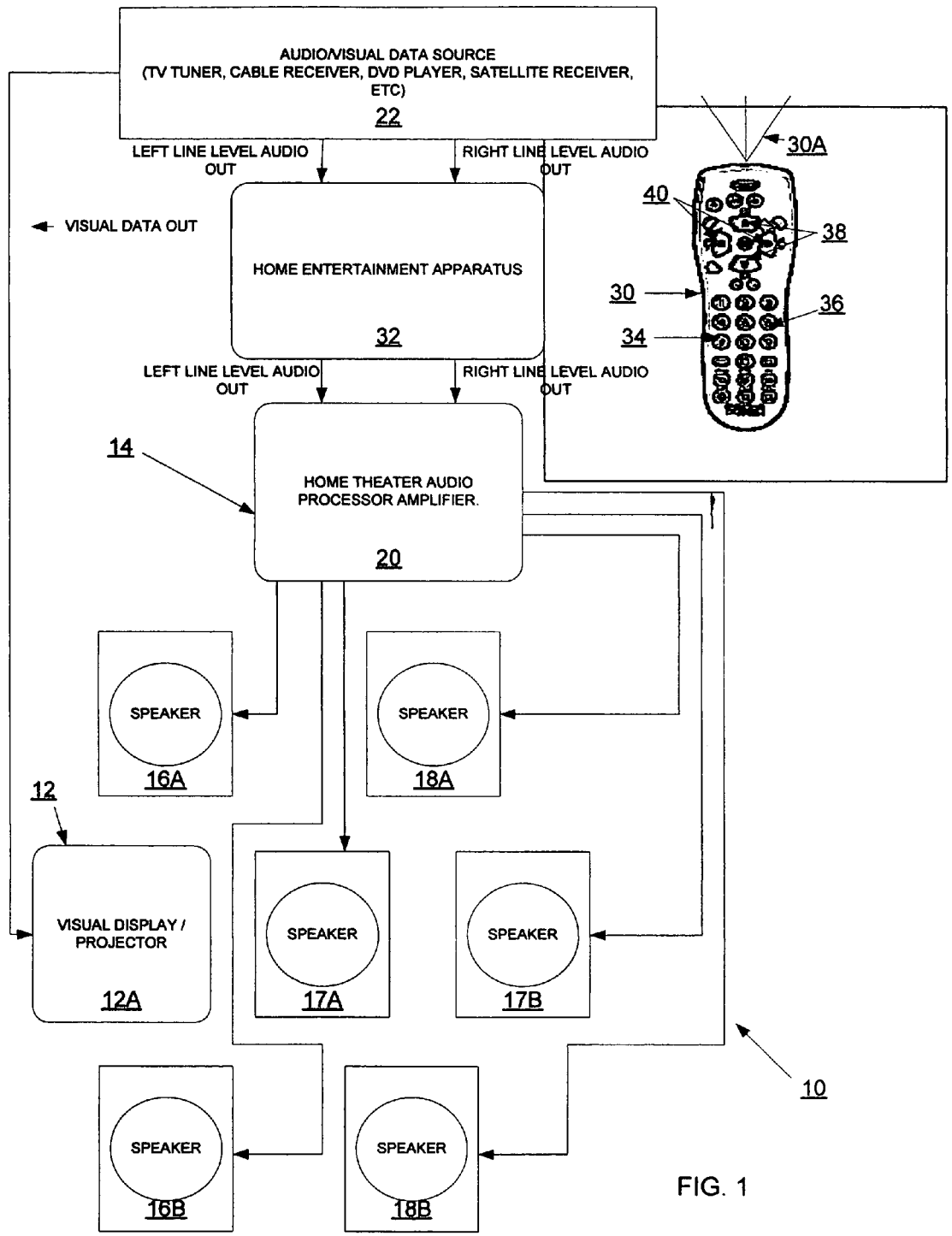

The present invention relates generally to an audio-video entertainment apparatus and method, and particularly relates to an audio device for use in conjunction with and as an addition to a visual display unit (such as a television) and with an interconnected audio system (such as a home stereo system or home theater system). The interconnected system is able to provide time sequenced and selected supplemental audio content which is supplemental to both the television picture and to the audio content of the audio-visual program (i.e., such as a television program). The supplemental audio content is provided in a spontaneous dynamic environment allowing for and promoting interaction of a view with the television program being watched.

For example, the present invention may be used to provide time-sequenced supplemental audio content (i.e., provided in addition to the audio content of a television program, or in addition to the audio/video content of a VHS or DVD video file, for example) in a spontaneous dynamic environment in order to enhance and accentuate the experience of viewing a sporting or other dramatic active event. Moreover, supplemental audio content is provided in a spontaneous dynamic environment by use of the inventive apparatus and method with a minimum of viewer distraction required to operated the apparatus. Such a spontaneous dynamic environment encourages infectious group enthusiasm, and enhances and improves the group experience of watching live or pre-recorded sporting events, such as foot ball and basket ball games, at home on television. A simulation of live attendance of the sporting event is thus achieved at home.

Further, the apparatus and method embodying the present invention may be incorporated into or made integral with another home electronic entertainment device (such as a television, VHS, or DVD player), or into a home theatre system (i.e., one capable of providing surround sound, for example).

That is, the selected supplemental audio content is provided, for example, to users of the audio-video apparatus along with the video images provided by the television, and along with the regular television audio content, which also plays through the user's home stereo or home theater system. The present audio-video entertainment apparatus provides substantially instantaneous random access to multiple files of selected supplemental audio content, such as cheers, music clips, novelty sound tracks (i.e., stamping feet, clapping hands, or even Bronx cheers, for example), and to stadium fight songs, in order enhance the infectious group viewing and listening experience of the users of the system. Overall, the viewing experience of those in a group watching sporting events at home can thus be made much more like the live experience of actual stadium attendance, with encouragement of the same infectious group enthusiasm, interaction, mutuality, and an overarching general "game ambiance." In fact, by use of the present invention, audio content that is additional to, more creative than, and more exciting than that experienced in the stadium by those actually attending the event can be achieved.

2. Related Technology

Audio players have been known for some considerable time. For example, a cassette tape recorder and player can be employed to add selected supplemental audio content played along with the audio of a television program. This selected supplemental audio content can even be mixed with and played over the same home stereo speakers or home theater speakers that the user is employing to provide the regular television audio content. In this way, such supplements as cheers, boos, fight songs, and novelty sound tracks, can be played along with the audio content of a sporting event, for example.

However, in the use of a cassette tape recorder and player for such a purpose, the selection of the desired audio clip, cheer, sound track, or other supplemental audio content, is awkward and time consuming to accomplish. This is the case in part because the cassette tape recorder has only sequential access to the audio content on any particular tape, and in part because the audio content of a particular tape is very limited. The greater the storage capacity of the tape, the longer is required to access any particular content on that tape. Thus, in the unpredictable and spontaneous dynamic environment of a real-time sporting event, time is simply not sufficient to access desired supplemental audio content from a list of available content located on a cassette tape, and to play the selected audio content in supplement to the live (or prerecorded) action of a sporting event as the event unfolds for the home viewers.

As an alternative to use of a cassette tape recorder and player, an MP3 recorder and player might be considered for such use. However, while the MP3 recorder and player offers semi-random access to the audio content recorded within the device, selection of the available content and providing of this content along with regular audio content of a televised live sporting event is not conveniently accomplished. That is, the MP3 player is not configured to mix the audio sources easily with the home theatre system, does not provide for beginning and ending manipulations of the added audio content to blend this content with the regular audio of a television program, and also does not provide the user with a remote control and indication capability. Such deficiencies of the MP3 player largely rule out its use in the context contemplated by the present invention.

SUMMARY OF THE INVENTION

In view of the deficiencies of the conventional related technology, it is an object of this invention to overcome or ameliorate one or more of these deficiencies.

Particularly, an object for this invention is to provide a simulation at home of the live interaction, mutuality, and infectious group enthusiasm that often accompanies live stadium attendance and viewing of a sporting event. That is, the live stadium experience often includes cheers, boos, novelty sound tracks, stamping feet, clapping hands, shouting, and other stadium live interactions of sports enthusiasts with the activities and play of the teams on the playing field. These sounds and interactions in a spontaneous dynamic environment can be substantially replicated at home by the use of this present invention in combination with a television, and a home stereo or home theater system.

To this end, the present invention provides an apparatus and method of mixing with and adding to the regular audio content of a televised (live or pre-recorded) sporting event, selected supplemental audio content in a real-time, spontaneous manner under the dynamic and creative control of one or more of the people watching the televised sporting event. The supplemental audio content is provided via the same home stereo or home theater sound system through which the television audio content is provided to the viewers of the television program.

Additionally, beginning and ending audio manipulations are automatically applied by the present invention to modify the supplemental audio content in such a way as to "smooth" the beginning and ending of the added audio content.

Further, the present invention provides an apparatus and method for wireless remote control of the apparatus by the user of the device, in order to select and mix supplemental audio content with regular television audio in real time. A standard television remote control may be used for this purpose, although the invention is not so limited. That is, the user need not physically manipulate a tape player, an MP3 player, or other device interconnected with his television and home audio system, and need not have a wired device extending to his viewing location, but may accomplish the selection and mixing of supplemental audio content from the comfort and convenience of the user's ordinary viewing location.

Similarly, the user can employ an Ethernet or USB port interface of the present audio apparatus with a home computer system having internet access, allowing the user to select, download, and store in the present audio apparatus, those cheers, novelty sound tracks, and other supplemental audio tracks that are appropriate and desired for particular sporting events. By means of the same USB or Ethernet interface, an application program running on the users home computer may be used to operate the apparatus according to the present invention.

Thus, the user of the present apparatus and method brings an element of novelty, creativity, and artistry to the viewing of sporting events by the individual selection of supplemental audio available to be utilized during the sporting event, in addition to the actual selection, sequence, and timing of the mixing of those supplemental audio tracks with the live (or pre-recorded) action and audio of the sporting event in a spontaneous dynamic environment.

Other objects, features, and advantages of the present invention will be apparent to those skilled in the art from a consideration of the following detailed description of a preferred exemplary embodiment thereof taken in conjunction with the associated figures which will first be described briefly.

BRIEF DESCRIPTION OF THE DRAWING FIGURES

Figure 2:
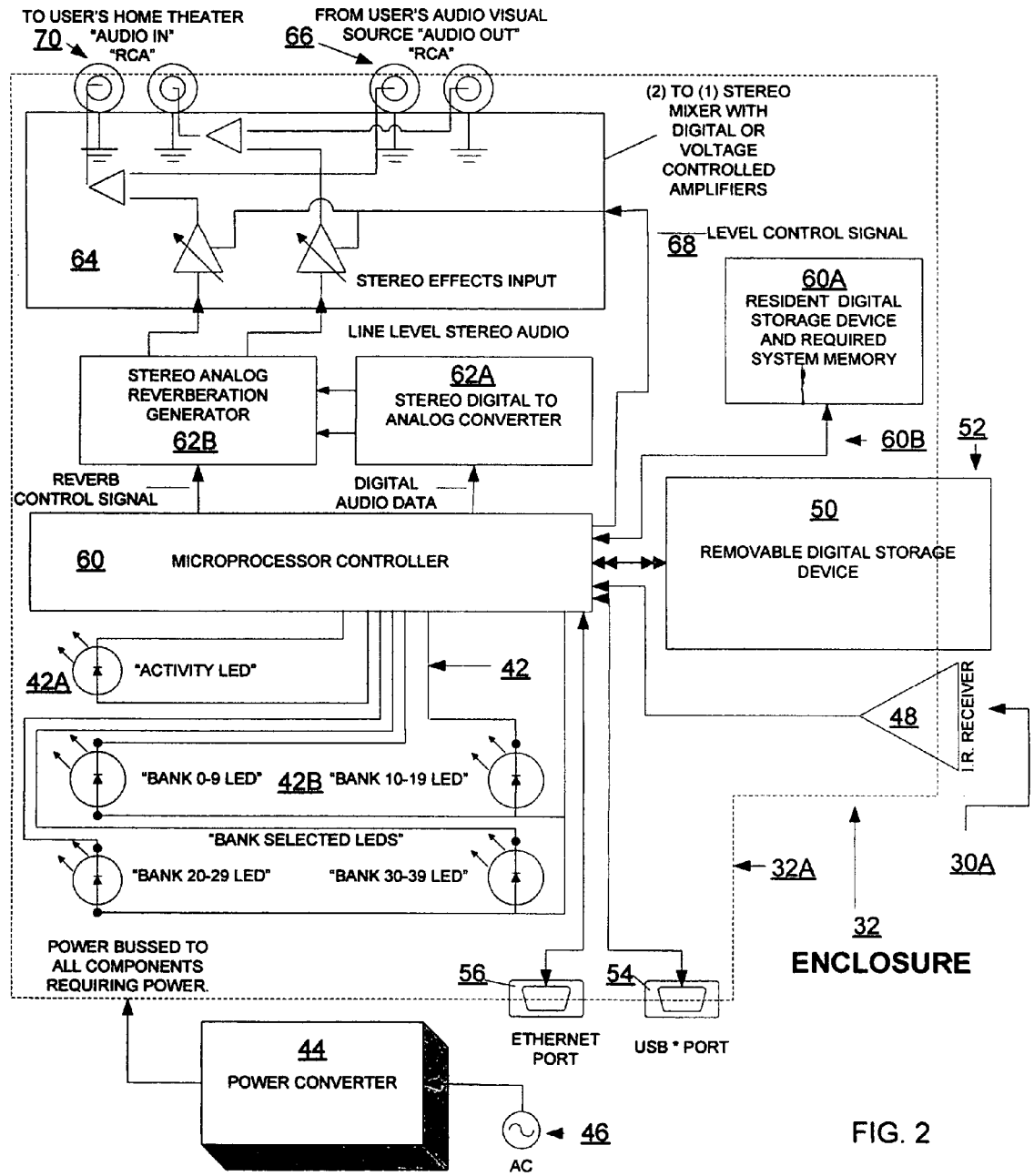

FIG. 1 provides a diagrammatic representation of a home entertainment system including apparatus embodying the present invention, and allowing the method of the present invention to be practiced;

FIG. 2 is an illustration in block diagram form of an apparatus embodying the present invention; and FIGS. 3 through 19 are flow charts illustrating the method of operation of the present apparatus by reference to the operative software that is implemented by a microprocessor based control system.

DETAILED DESCRIPTION OF EXEMPLARY PREFERRED EMBODIMENTS OF THE INVENTION

While the present invention may be embodied in many different forms, disclosed herein is one specific exemplary embodiment which illustrates and explains the principles of the invention. In conjunction with the description of this embodiment, a method of providing supplemental audio content for an audio-video system is described. It should be emphasized that the present invention is not limited to the specific embodiment illustrated.

Referring first to FIG. 1, a home entertainment system 10 is depicted diagrammatically. The system 10 includes a visual display unit, such as a television 12, which may be of any desired type. In other words, the television 12 may be a convention cathode ray tube type, a projection television, a flat panel type of television, or any other type. The television 12 provides a video display, indicated with the numeral 12a, and also has an audio output function. With a stand-alone television, the audio output function will ordinarily be performed by a built in or integral speaker or speakers 12b, which provide the ordinary or regular audio content of the television program or channel being displayed on the television 12. Alternatively, the television 12 may be interfaced with a home stereo system (not seen in the drawing Figures) so that the speakers of this home stereo system are utilized to deliver the audio portion of the audio-visual program from the television 12. Further, it is also well understood that many entertainment systems, such as the system 10, include a multi-channel audio output system, generally referred to as a home theater system 14. The home theater system provides multi-channel audio (i.e., 2 channel stereo, 4 channel surround-sound, or 5 channel bass-enhanced surround-sound, for example). The system 10 according to the preferred exemplary embodiment provides what is referred to as 5.1 channel surround sound, and has a front left speaker 16a and a front right speaker 16b. A left rear speaker is indicated at 18a while a right rear speaker is indicated at 18b. A bass cannon type of speaker 17b and a display point-source speaker 17a may also be included in the system 10, as is well understood (i.e., in a 5-channel bass-enhanced system, for example). And again, although the components (i.e., tuner, amplifier, turntable, tape player, and/or CD player) of a home stereo music system are not shown in FIG. 1, it is to be remembered as well that the speakers 16a-18b (i.e., as few as two speakers, or possibly four or five or more speakers) may be components also of such a home stereo music system.

Further, the home theater system 14 includes a controller 20, which is used to separate out and to amplify and provide the two, or four or five channels of sound for the speakers 16a-18b (although it is to be recognized that the invention is not so limited, and that some home theater systems may use the home stereo music system for all or part of this function). The controller 20 provides for volume control, left-right balance, front-rear fade control, etc., as is well understood. Also, the system 10 may include a cable or satellite decoder box 22, which provides for the system to receive audio-video signals (i.e., television programs and sporting events, for example) from a cable or satellite entertainment content provider, as is also well understood.

The system 10 may also have a VHS recorder/player 24, and/or a DVD recorder (or DVD recorder/player or TiVo type of recorder/player (all generally indicated by the reference numeral 24). With the exception of the speaker wires 26 to the various speakers 16a-18b, the interconnections of the various components 12, 14, 20, 22, and 24 of the home theater system 10 are not detailed in FIG. 1. These interconnections will vary with the configuration and elements of, and according to the requirements of, the particular components of the home theater system 10, and are well understood in the pertinent arts.

However, a user of the system 10 controls essentially all of the functions of the various components of the system 10 using one or more wireless remote control devices 30 (again, the invention is not so limited, and may be used with more than one remote control, or without remote control(s), or one or more of the remote control(s) may be of the wired type). The various remote control devices 30 control the devices of the system 10 by means of infrared or other signals, generally indicated by the arrowed numeral 30a.

Further considering the home theater system 10 illustrated diagrammatically by FIG. 1, it is seen that this system also includes an audio-video sports entertainment apparatus 32 for carrying out a method of the present invention. That is, the apparatus 32 provides an audio device for use in conjunction with a television 10, and an interconnected audio system, such as a home stereo system or home theater system 14, in order to provide time sequenced and selected supplemental audio content for a sporting or other event.

Further viewing FIG. 1, a typical infrared remove control device 30 is depicted. The invention is not limited to any particular type or configuration of remote control. However, it is seen that the typical remote control 30 seen in FIG. 1 includes device selector switches or pushbuttons (indicated at 34) by which the remote control may be switched among available devices to control. For example, the remote control 30 may include settings for: TV, VCR, DVD, and AUX (meaning auxiliary). Various remote controls will be configured to control several home entertainment devices. Thus, the remote control 30 may be configured to control a TV, a DVD, and one or more auxiliary devices. The apparatus 32 may be selected to be an auxiliary device for the remote control 30, although the invention is not so limited. That is, alternatively the apparatus 32 may have a dedicated remote control.

In the preferred embodiment, the remote control 30 is configured to control a TV, a VCR, and one auxiliary device. Accordingly, the remote control 30 includes a key pad 36 of numbered pushbuttons 0-9, a channel select rocker button 38 (i.e., rocking up for a higher numbered channel and down for a lower numbered channel) or pair of buttons, and a similar volume select rocker button 40 or pair of buttons.

Turning now to FIG. 2 it is seen that the apparatus 32 includes a housing 32a, seen in FIG. 1 as a solid box line and depicted in FIG. 2 by a dashed line. Outwardly displayed on the housing 32a is an array of 5 indicator lamps or lights, generally indicated with the numeral 42. These lights may be light emitting diodes (LED's) although the invention is not so limited. The array 42 includes a light 42a, which when lighted indicates to a user of the device 32 that an a valid remote control signal is being received and a function is implemented. So too, the array includes 4 lights generally indicated with the underlined numeral 42b, which when lighted individually indicate the respective one bank of audio files that has been selected for indication of a particular file to be played. The preferred embodiment includes 4 bank indicator lights 42b, respectively indicated with the numerals 0-9, 10-19, 20-29, and 30-39. Thus, the preferred embodiment provides the user with an internally stored selection of 40 audio files that may be selected. As will be seen, however, the apparatus has the facility to accept a removable memory media (i.e., such as a flash memory card, or compact flash card) so that a larger number than 40 of audio files may be available to play. In the case of a larger number of files than 40 being available to play, the indicator lights 42b may include more than 4 lights, or the 4 lights of the preferred embodiment may be lighted in groups of two or more to indicate the bank of audio files selected. That is, lights 0-9, plus 19-20 when lighted together could indicate the files 40-49, and so on).

Further considering the diagrammatic presentation of FIG. 2, it is seen that the apparatus 32 is associated with a power converter 44, receiving line power from a receptacle 46. The power converter 44 provides the lower voltage level and power required for the apparatus 32. Apparatus 32 also may receive inputs (arrowed numeral 30a) from the remote control 30 via an infrared port or receiver 48. Again, the apparatus 32 is not limited to the use of a remote control or to the use of any particular type of remote control. However, operation of the apparatus 32 by use of a remote control 30 is the intended primary mode of operation and is explained in detail below. The operation of the apparatus 32 by use of one or more remote controls 30 is believed to most effectively contribute to and promote the creation of a spontaneous dynamic environment in which user(s) of the apparatus 32 add to the home viewing experience for sporting events and other activities in a creative and individual way.

A reader 50 for a removable digital storage media 52 (i.e., a memory card) also provides optional input to (i.e., by changing out one memory card for another) and audio file storage memory for the apparatus 32. As will be further explained, insertion of a memory card 52 into the reader 44 makes a supplemental library of sound effects which are stored on the memory card immediately available to the user of the apparatus 32. Further, by appropriate input commands effected to the apparatus 32 (i.e., using a computer communicating over a USB port, or over a network interfaced via an Ethernet port), one or more of the sound effects (i.e., audio files) stored on the memory card 46 may be relocated to permanent memory and stored in the apparatus 32 at a selected one of the "on board" memory locations.

Further to the desired function of the user being able to select and store sound effect files in the apparatus 32, it is seen that the apparatus includes a USB port 54 and an Ethernet port 56. Each of the ports 54 and 56 provide for the apparatus 32 to be interfaced with a personal computer (i.e., either directly via USB, or via a network via Ethernet), and via the personal computer to be interfaced with the internet. Consequently, the user 28 of the apparatus 32 may access the internet, and select from a great variety of interesting sound effect files presently there available or to be made available in the future. Desirably, the sound effect files are MP3 files, although the apparatus 32 is not limited to use of MP3 audio files. That is, the apparatus 32 may accept and play audio files of format other then MP3. For example, the apparatus 32 may accept and play Wave audio files.

As is seen in FIG. 2, all of the input and output functions of the apparatus 32 are moderated to and by the microprocessor-based control unit or controller 60. This controller 60 according to the preferred embodiment includes some on-board memory 60a (i.e., non-volatile, as well as random access memory which may be volatile), which may be implemented as EPROM and RAM memory, and in which the programming of the controller 60, as well as at least a partial library of sound effect files (i.e., a library of 40 internally stored audio files according to the preferred embodiment) are stored. As is seen in FIG. 2, the on-board memory in the preferred embodiment is implemented by use of a resident (on board, but not on-chip) digital storage device 60a, which communicates with the microprocessor controller 60 via a bi-directional command and data link 60b. Alternatively, as will be well understood to those ordinarily skilled in the pertinent arts, the microprocessor controller 60 my have an associated internal (or on-chip) memory facility, which may be of the PROM, or RAM type (or of both types), or the necessary memory facility may be of another type according to the particular processor and architecture selected for implementing the controller 60. The controller 60 provides an audio output via a stereo digital-to-analog (D/A converter) converter 62a, which is associated with a stereo analog reverberation effect generator 62b. It will be understood that the invention is not limited to use of an analog reverberation effect generator, and that a digital reverberation effect generator may be utilized.

Still alternatively, the desired audio reverberation effect may be digitally generated using the microprocessor of controller 60. These stereo D/A converter 62a and reverberation effect generator 62*b* provide audio output signals to an output amplifier/mixer stage indicated with the underlined numeral 64. The amplifier/mixer stage 64 receives at input connectors 66 the regular or ordinary audio program (mono or stereo) from the television 12, or cable/satellite de-scrambler or decoder box 22, or from the home theater unit 20, along with a level control signal via conductor 68, such that when the apparatus 32 is active to provide supplemental audio content to the user 28, the level control signal on conductor 68 determines the comparative volume or level of the audio program or file provided by apparatus 32 versus the volume of the regular audio program, recalling the explanation provided above. The resulting mixed and loudness regulated audio signal is provided by the stage 64 via output connectors 70. This mixed audio signal available at connectors 70 may be provided to the user's home stereo system or to the home theater system 20 (again, particular connections within the system 10 will vary dependent upon the configuration and mix of components of the system) for then being provided to the user 28 via the speakers 16, 18.

Figure 3:
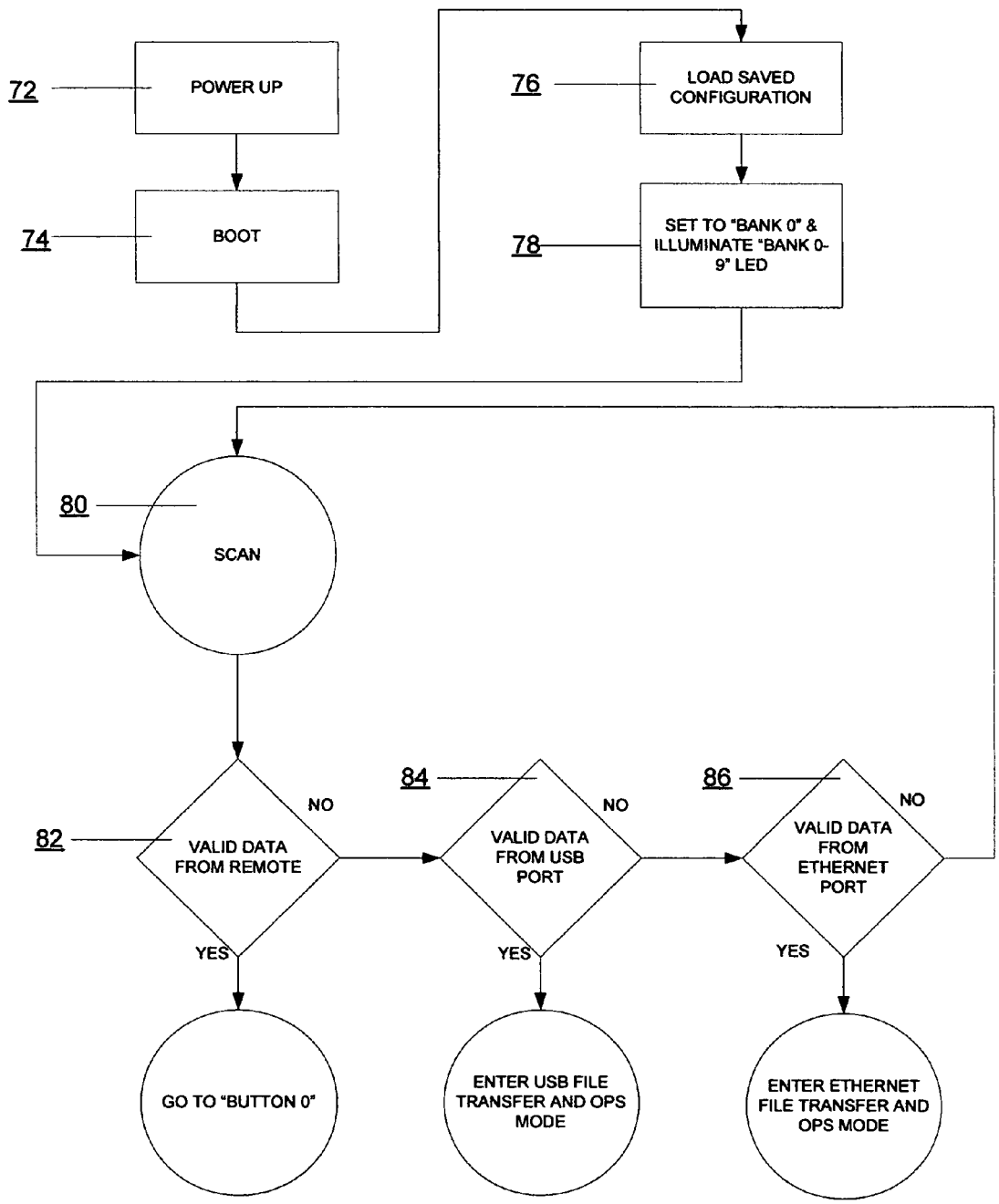

FIGS. 3-19 are exemplary simplified flow charts illustrating by example the operations of the controller 60 and effecting the resultant action by the apparatus 32 in playing a selected audio file, for example. Turning first to FIG. 3 it is seen that upon the apparatus 32 being turned on (indicated with reference numeral 72, and the label "power up") the controller 60 immediately goes through a boot sequence (indicated at 74), loads saved configuration settings from the users last use of the apparatus (indicated at 76), and sets a bank select pointer to bank 0-9 while also lighting the front panel LED labeled "0-9." Thus, it is seen that the bank 0-9 is a default operating bank for the apparatus 32, and the user may play an audio file from this bank substantially instantaneously by pushing one of the numbered buttons 0-9 on the remote 30.

Continuing with consideration of FIG. 3, it is seen that the controller 60 then enters an activity loop (i.e., a do loop), starting at a node labeled "SCAN" on FIG. 3 and indicated with the numeral 80. From the node "SCAN," the controller continuously interrogates three decision cusps labeled 82, 84, and 86 on FIG. 3. The second and third of these decision cusps (i.e., cusps 84 and 86) are tests looking for input or interface with the apparatus 32 via the USB or Ethernet ports 54 and 56, respectively. Thus, as was explained, a user of the apparatus 32 may interface it either directly or via a network with a computer, and with sources of audio files, such as the internet. Also, the user of the device 32 may elect to utilize an application program on the interfaced computer, which program will provide to controller 60 duplicates of the input commands it would receive from the remote 30. Thus, the user may operate the apparatus 32 from an interfaced computer. For example, the application program can provide on the computer monitor a replica of a remote control, the buttons of which the user can manipulate by use of the computer cursor and clicks of a mouse device.

Also seen on FIG. 3 at is the decision cusp 82 which leads to a "go to button 0" command. When the user of the apparatus 32 is using the remote control 30 and makes any input via this remote control, the decision cusp 82 is activated. Turning now to FIGS. 4-13 (which are sequential portions of a decision tree), it is seen across the top of these figures that a sequence of decision cusps each labeled 88 and starting with button "0" leads either to the next cusp in the sequence (i.e., to a question of whether the next higher numbered remote push button is pushed) or to a dependent decision tree in the event a numbered button of the remote 30 is pushed by the user. Because all of the dependent decision trees through FIG. 13 are the same, only the one associated with button "0" on FIG. 4 will be explained in detail.

Figure 4:
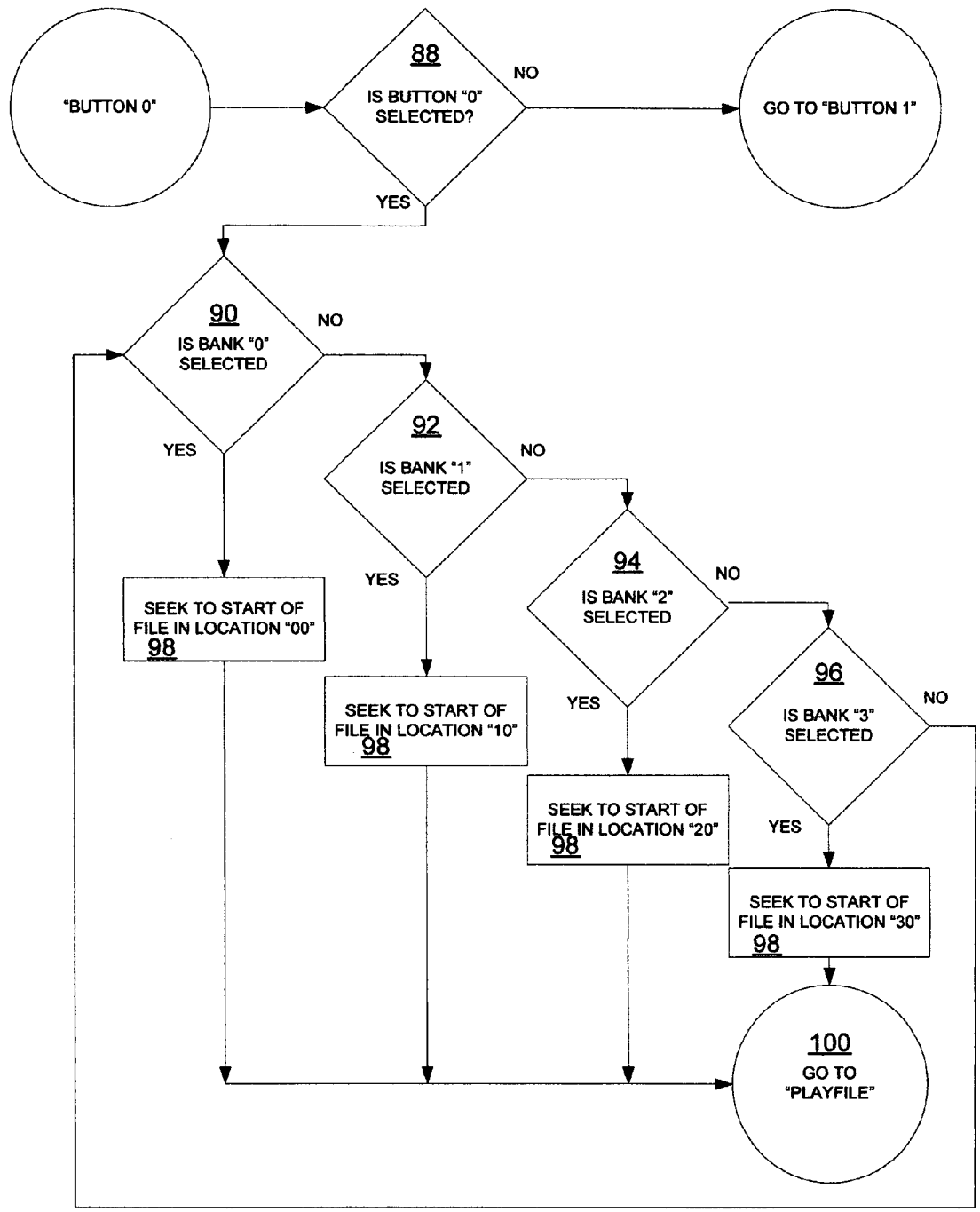
Figure 5:
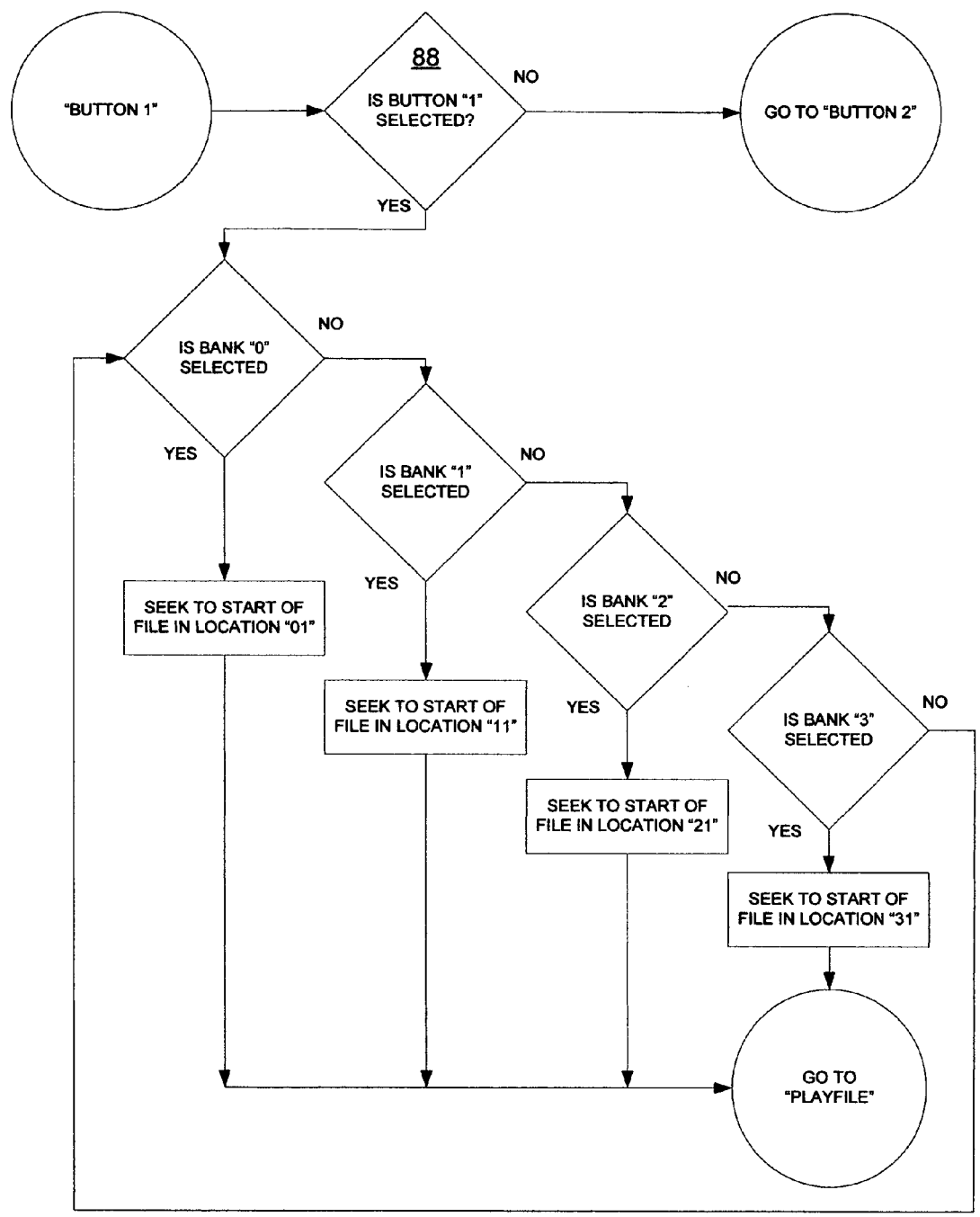
Figure 6:
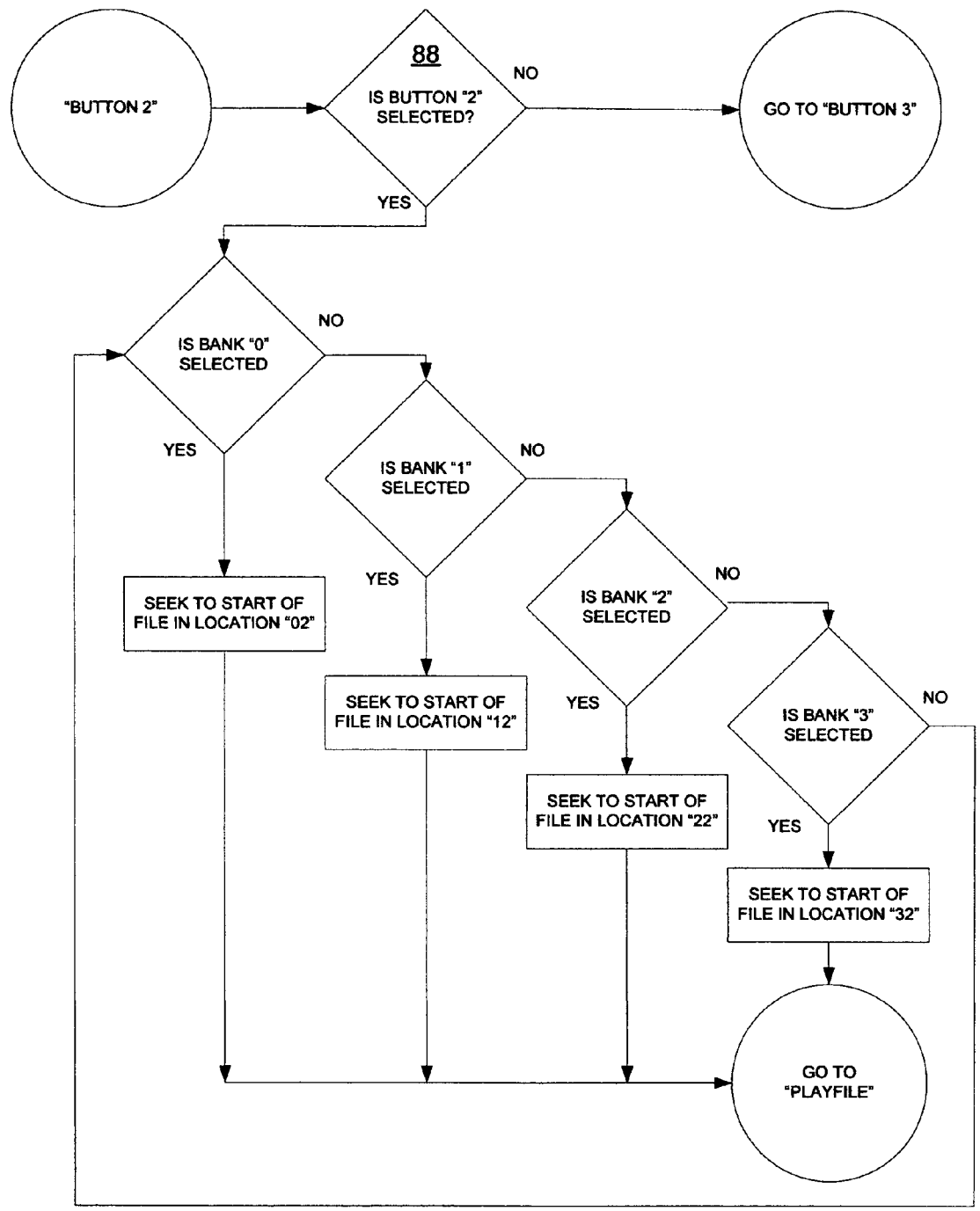
Figure 7:
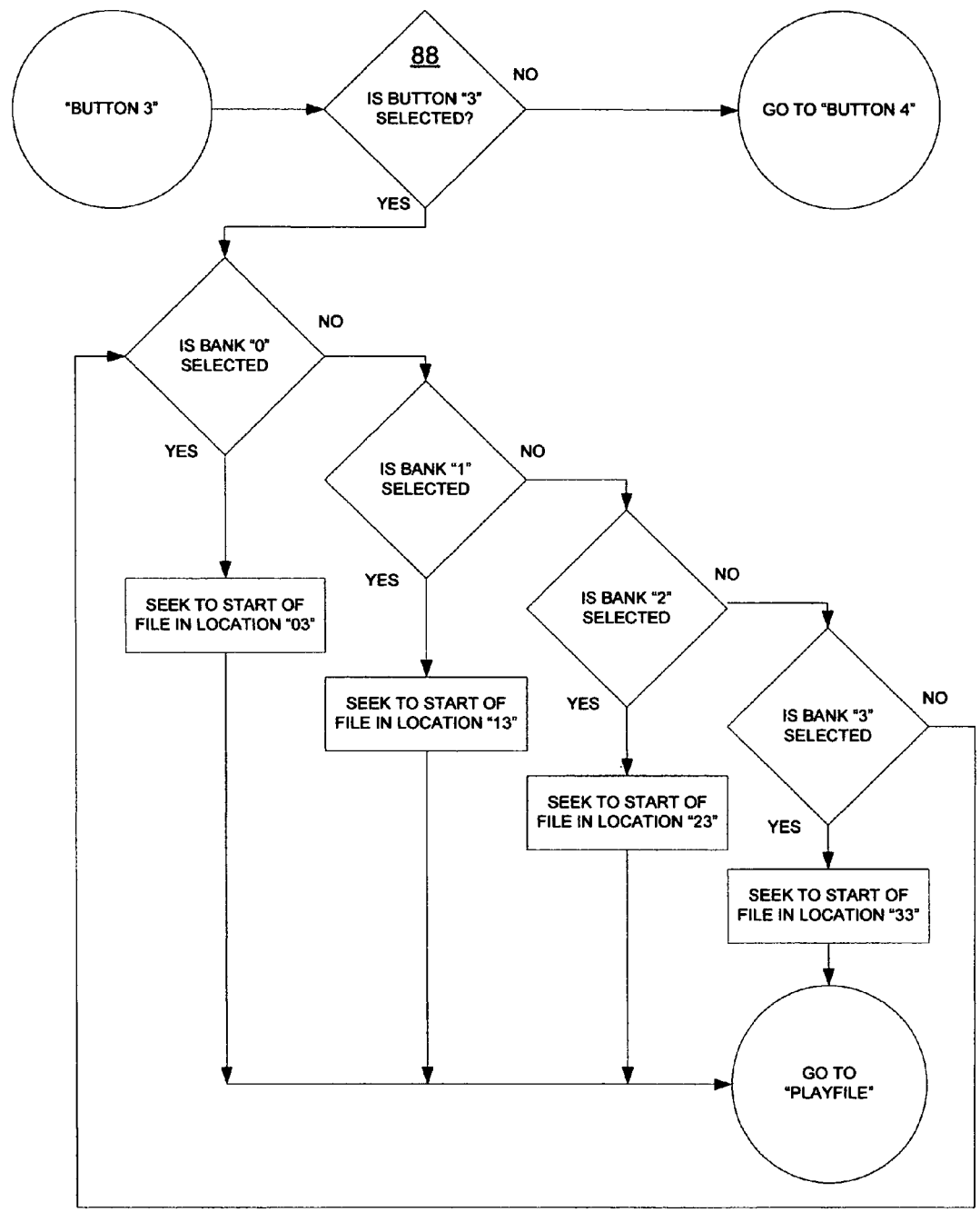
Figure 8:
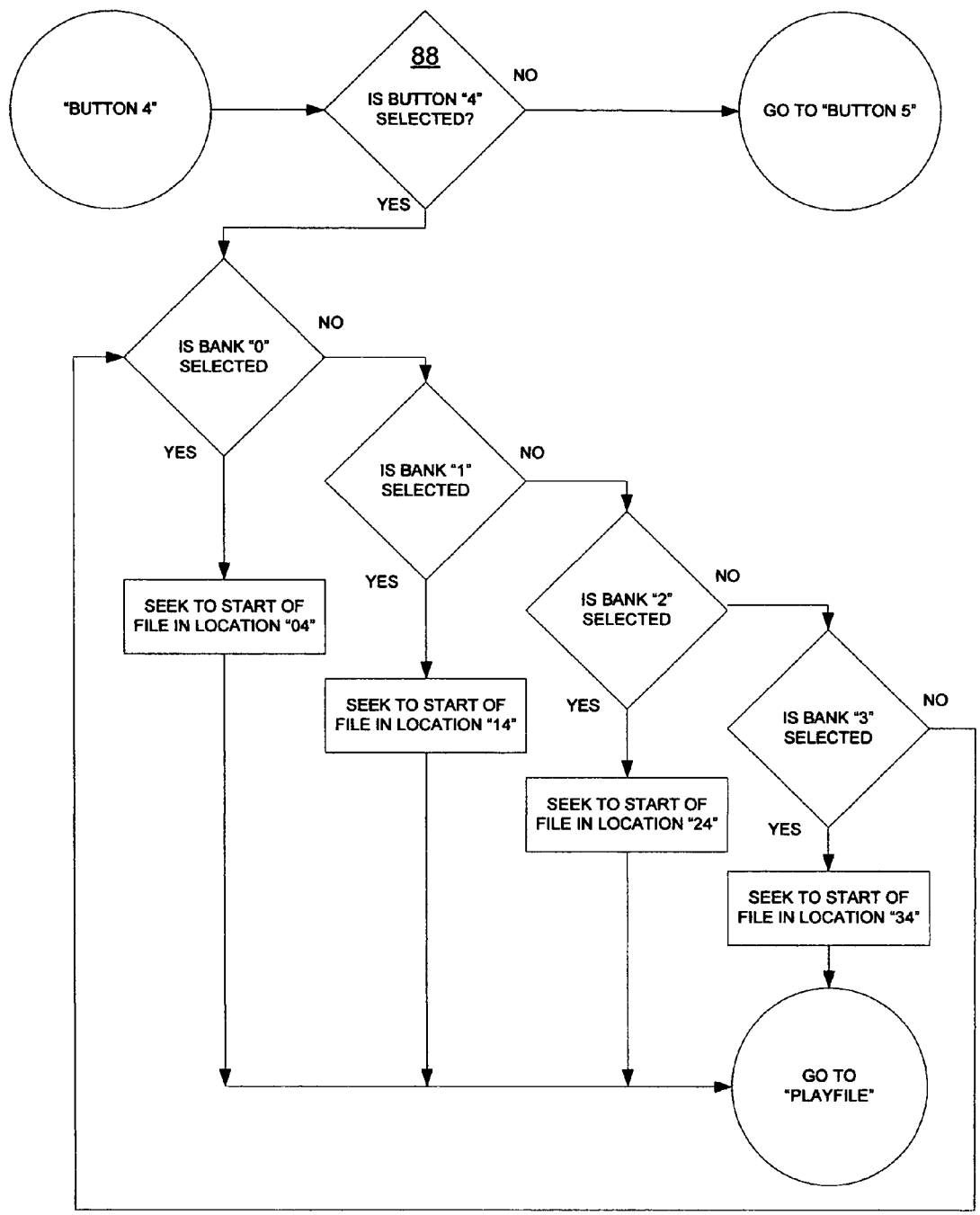
Figure 9:
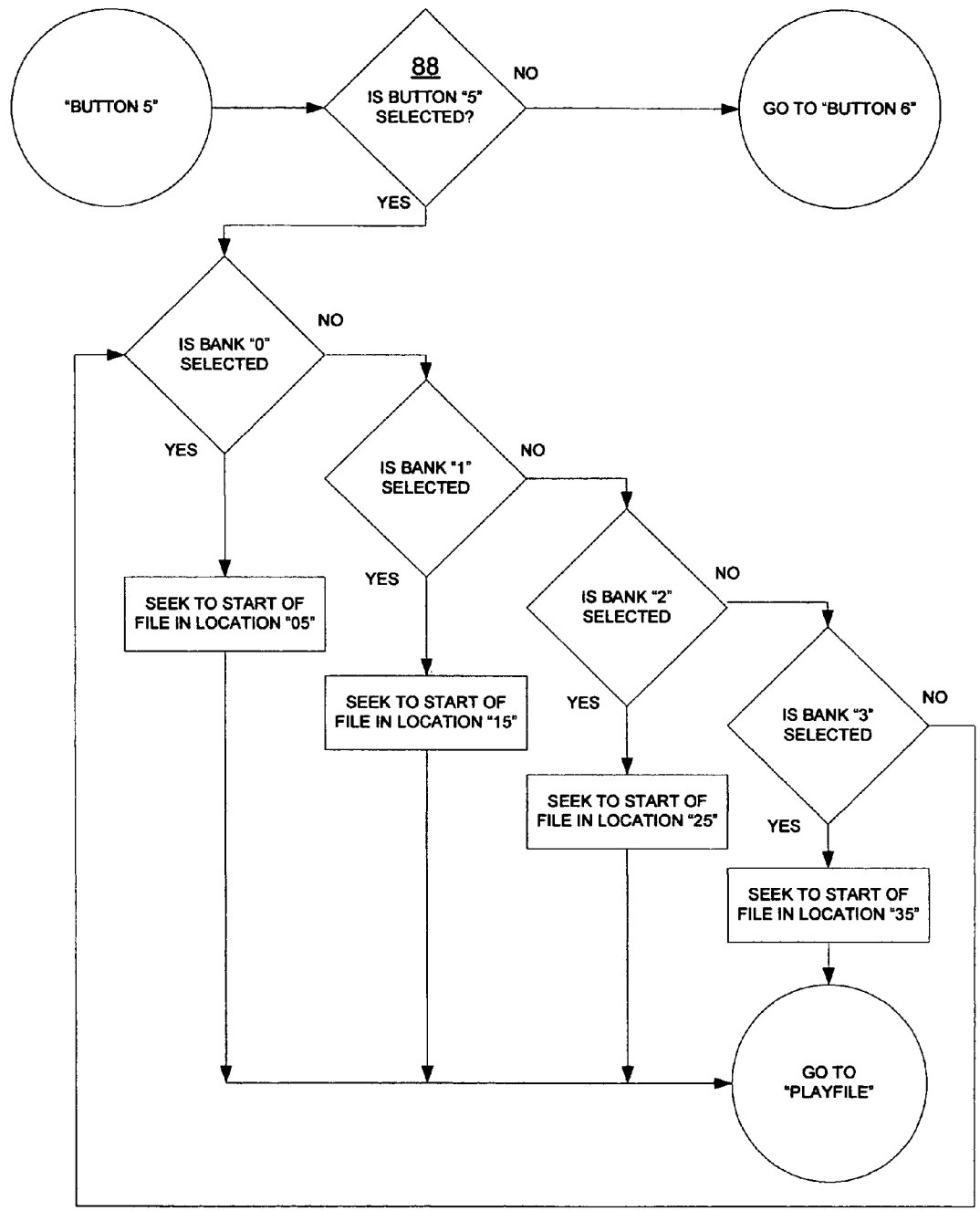
Figure 10:
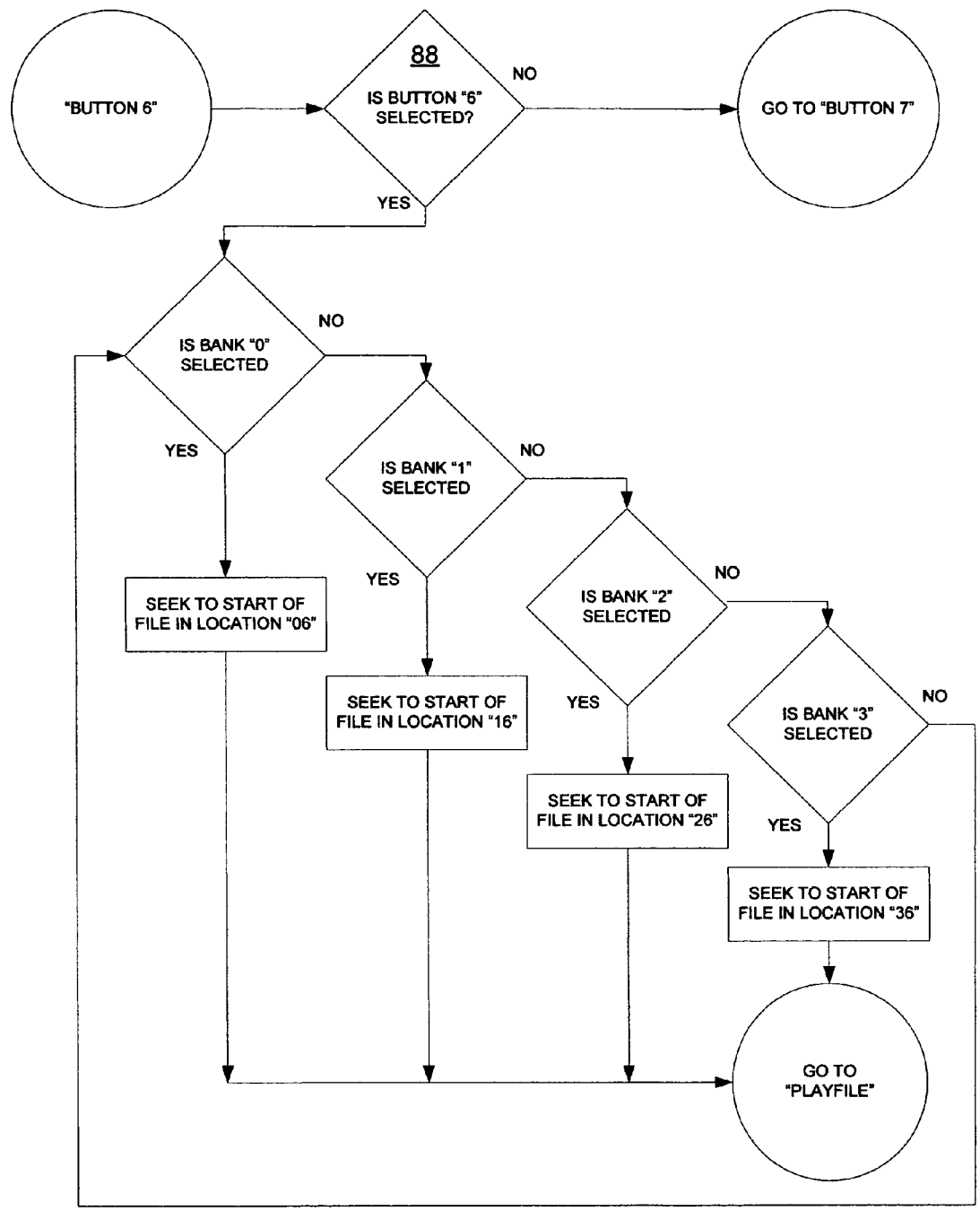

Considering the dependent decision tree of button "0" on FIG. 4, it is seen that four sequential decision cusps labeled 90, 92, 94, and 96 respectively lead to particular audio file identifiers (each labeled 98 although each leads to a different audio file location). Subsequently, the identification of a particular audio file to be played leads to a "PLAY FILE" command (each labeled 100). On FIG. 14 it is seen that the "PLAY FILE" command leads to an activity sequence beginning with the starting of playing the selected audio file (indicated at 102). The selected file starts playing at a default value of zero (0) volume, and at 104 on FIG. 14 it is seen that the controller 60 ramps up the volume of the selected file to a pre-selected volume level Vx in an interval of "x" seconds. The value for this variable "x" is pre-selected. At decision cusp 106 it is seen that if the apparatus 32 is in "momentary" mode, the selected audio file is played until the user releases the numbered pushbutton on remote 30. When the user does release this pushbutton, then the decision cusp at 108 results in the selected file being ramped to zero volume (effected at 110 on FIG. 14). In the event the apparatus 32 is in "Toggle" mode then a touch of the particular numbered button on the remote 30 starts the selected audio file playing, and it plays until one of two things happens. Either another different numbered button is pressed on the remote 30 by the user (detected at 112 on FIG. 14) in which case the volume of the selected file is ramped down (again at 110 on FIG. 14). The ramping down of the volume of the playing file is preparatory to the beginning and ramping up of the volume of the next selected audio file according to the number of the numbered button just pushed by the user on remote 30. Or, if the end of the selected file is detected (indicated at 114 on FIG. 14) then the volume is again ramped down, as indicated at 110 on FIG. 14. In each case, the activity indicated at 116 on FIG. 14 stops the playing of the selected audio file (which happens at zero (0) volume). And, the controller 60 then reverts to the SCAN loop, as is also indicated on FIG. 14.

Figure 15:
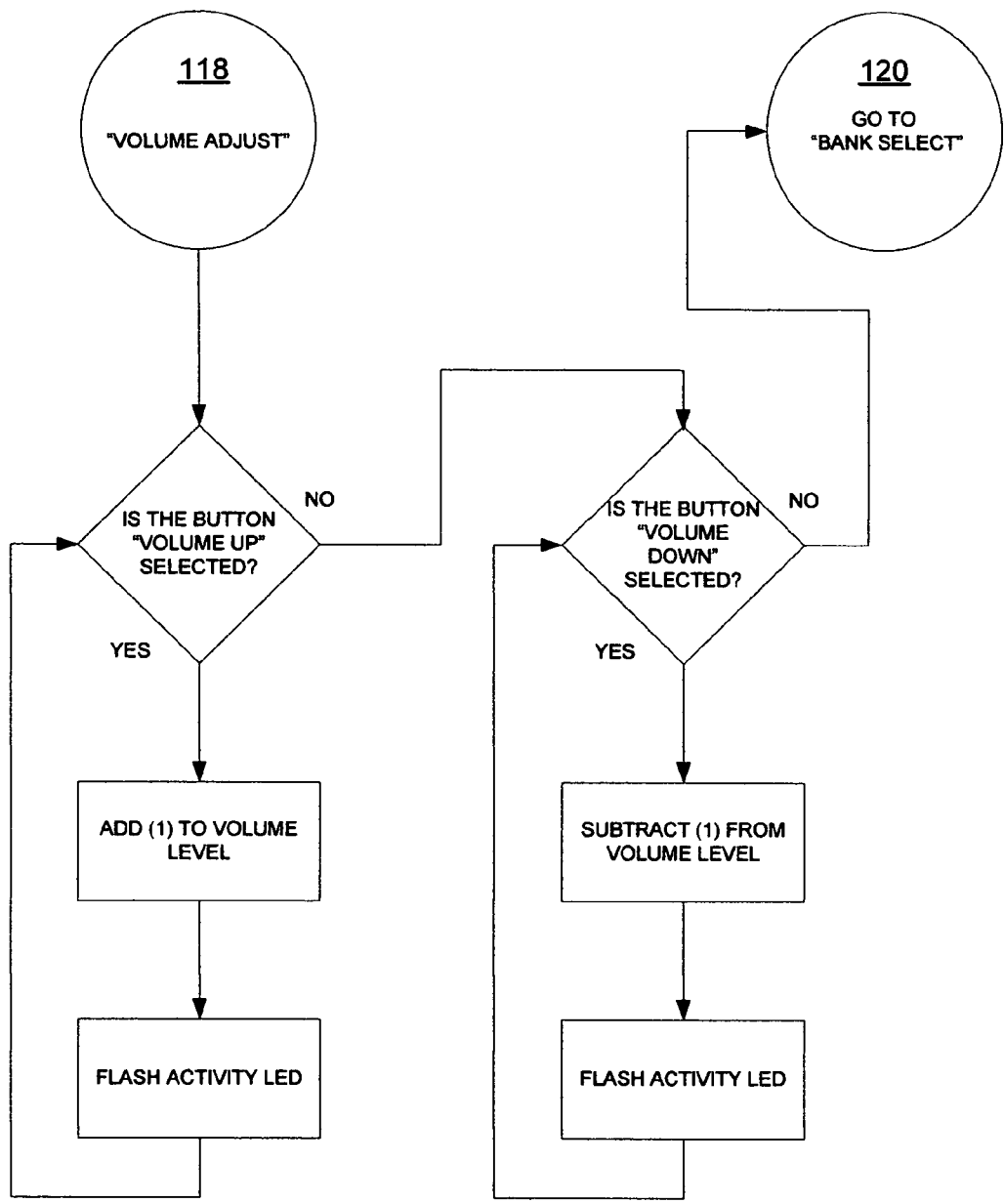

As FIG. 13 shows near the upper right hand corner of this Figure, in the event that no numbered button on remote 30 is pressed by the user during a particular scan cycle, then the controller 60 enters a sequence of control functions. As is indicated on FIG. 13, according to the preferred embodiment, the first of the control functions is "Volume Adjust." FIG. 15 indicates that "Volume Adjust" includes two decision cusps, labeled 118 and 120 on this Figure. In the event that the "volume up" or "volume down" buttons are pressed (or pressed and held) on remote 30 then a digital one (1) is either added or subtracted, respectively, from the value of Vx. In each case as Vx is incremented upwardly or downwardly in value (in response either to a volume button push and release, or in response to a button push and hold as a slew switch), then the activity light 42*a* on the front panel of the apparatus 32 is flashed once also so that the user can judge how much of a change is being effected in the value of Vx. FIG. 15 shows that in the event that no volume change is effected during a particular scan cycle, then the controller 60 enters the "Bank Select" function.

Figure 16:
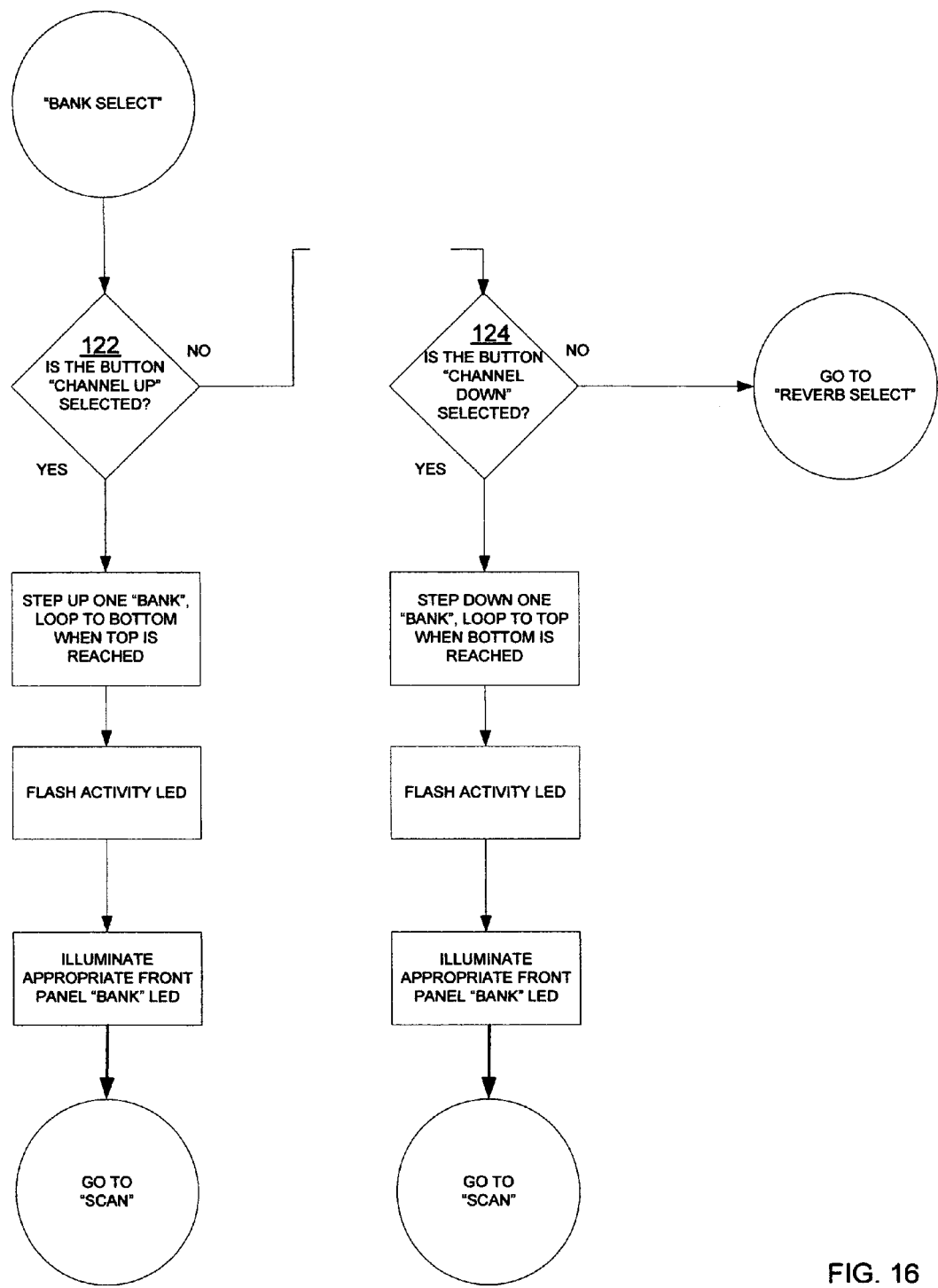

Turning to FIG. 16, it is seen that "Bank Select" also includes two decision cusps labeled 122 and 124. According to the preferred embodiment of apparatus 32, these decision cusps are accessed and implemented by using the channel up/down switch or switches on remote 30. As each of the activity sequences dependent from cusps 122 and 124 on FIG. 16 shows, when a "bank select" function is effected, the controller either steps up or down through the identified banks (i.e., 0-9, 10-19, 20-29, and 30-39) of audio files, and the appropriate bank indicator light 42b on the front of apparatus 32 is lighted. In the event that additional banks of audio files are available (i.e., on memory card 52 for example) then the banks of files will exceed four (4) and the user can also step through these in sequence. In such a case, the indicator lights 42b are lighted by controller 60 in combinations of two or more lights to indicate a pre-arranged sequence of the available banks of audio files.

Figure 11:
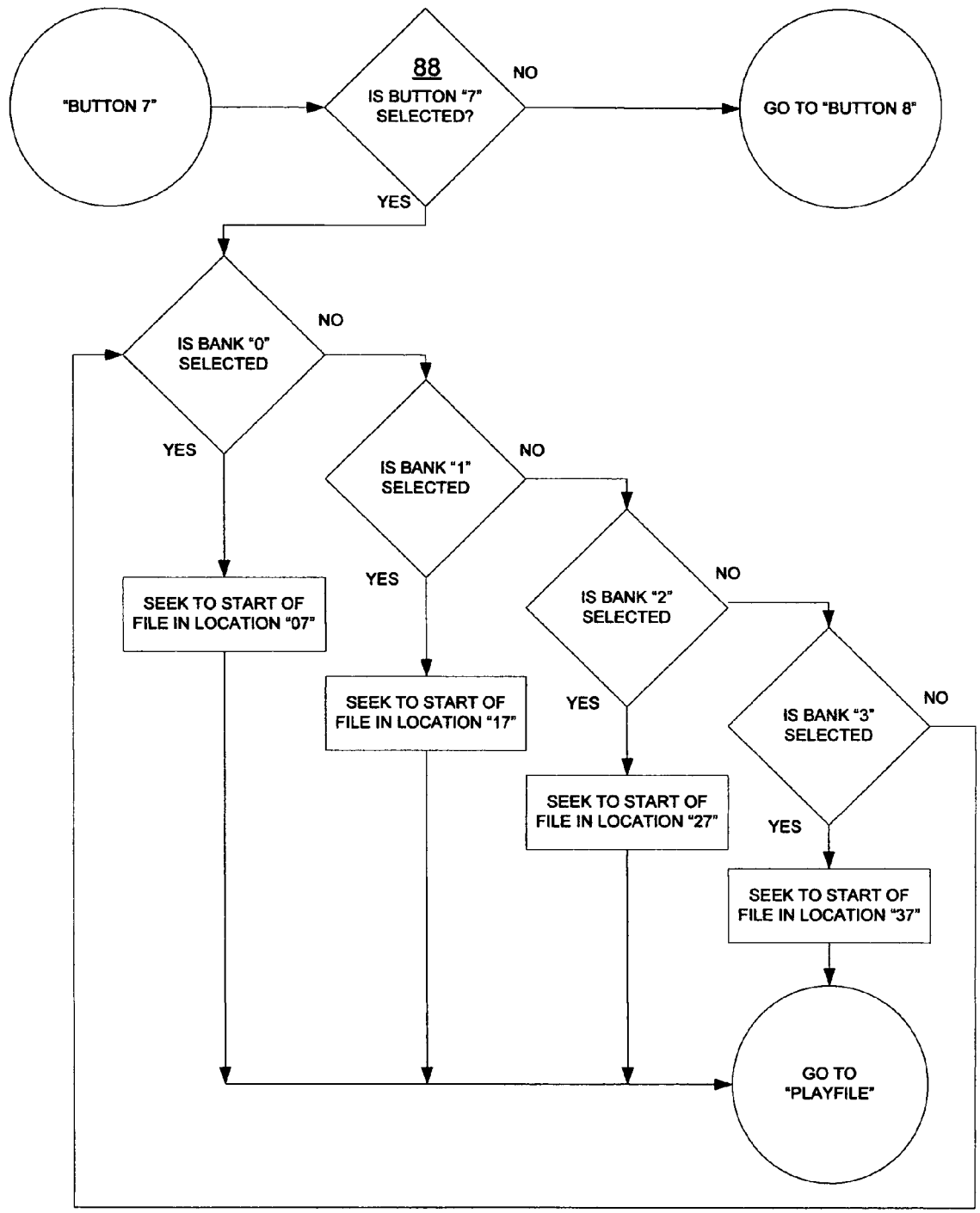
Figure 12:
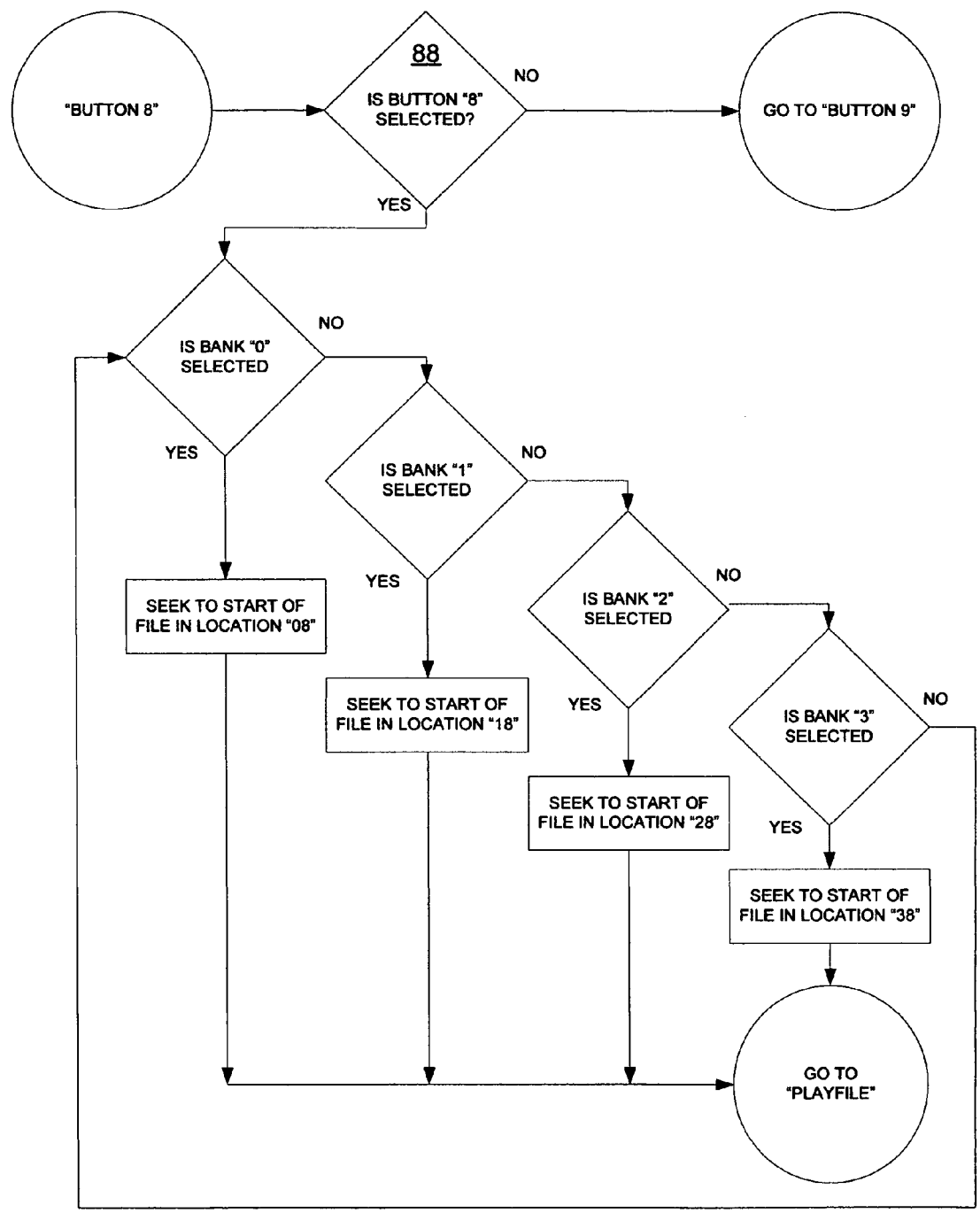
Figure 13:
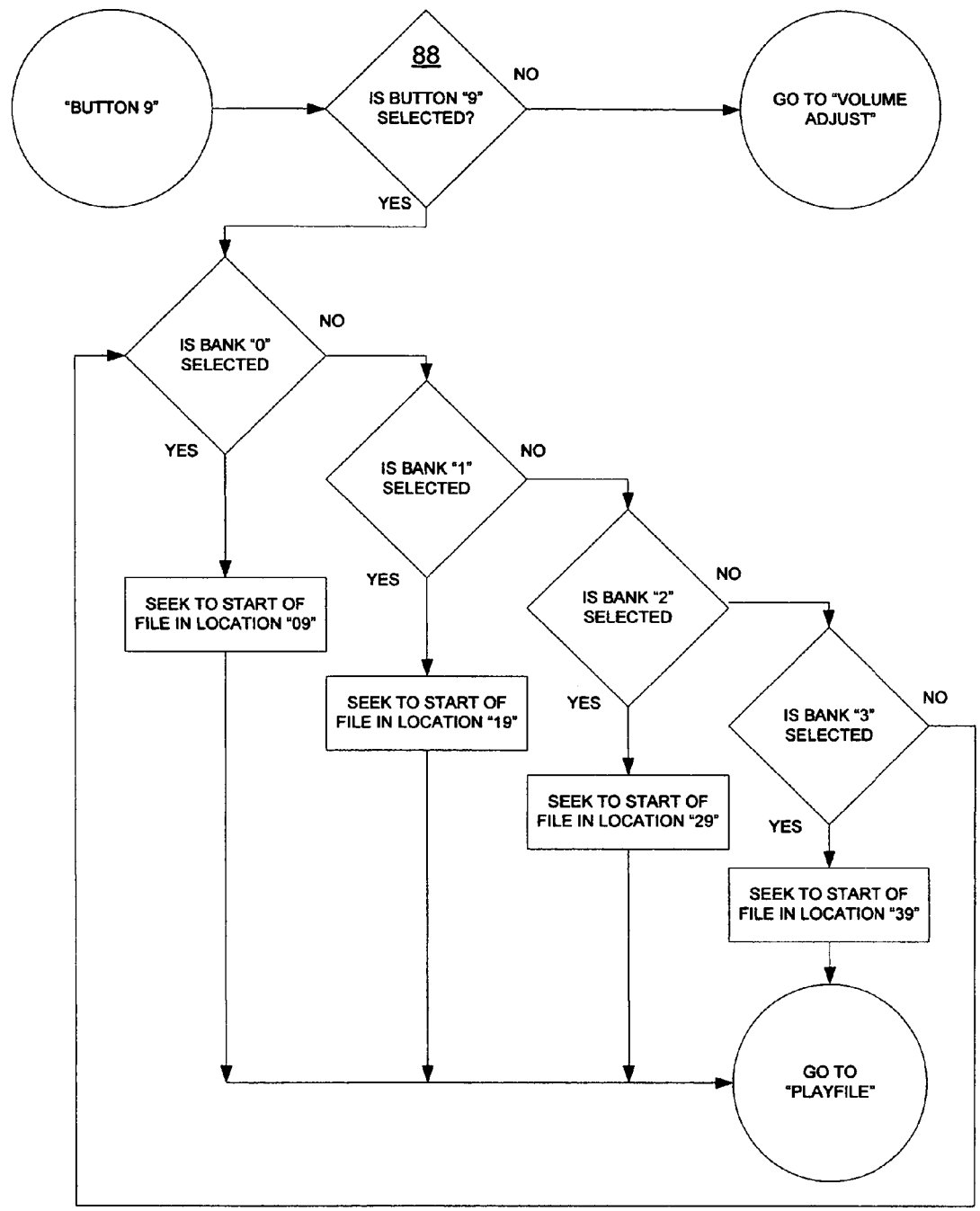
Figure 14:
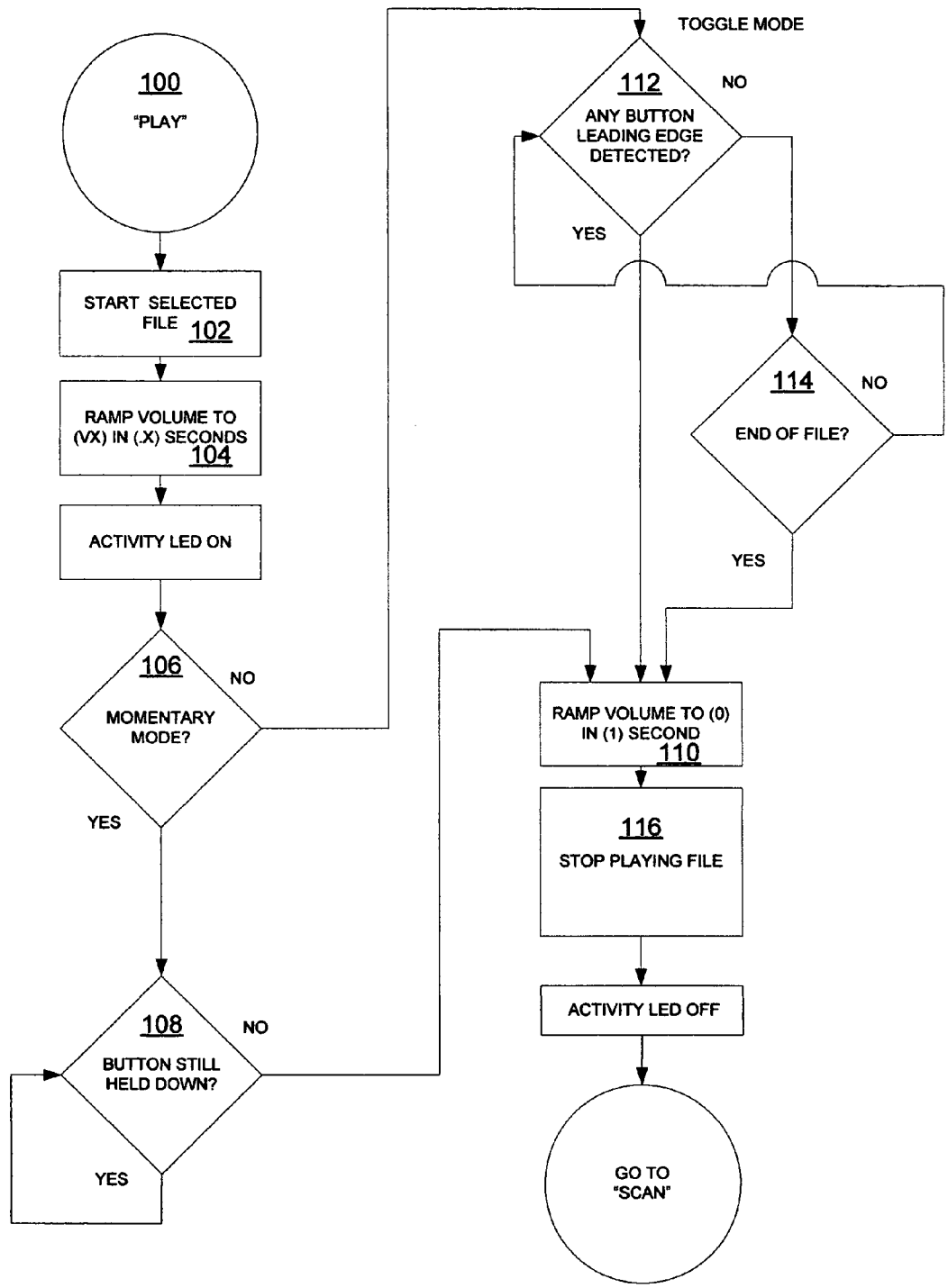

In the event that no "bank select" function is effected during a particular scan cycle of the controller, then FIGS. 11 and 12 indicate that the controller 60 next enters a "Reverb Select" control function. Viewing FIG. 17, it is seen that the "reverb select" function involves a single decision cusp 126. In the event that the decision cusp 126 is implemented by the user pressing the "video play" button on remote 30, then the controller 60 steps sequentially through three available reverberation effects which are available in the preferred embodiment of apparatus 32. It will be understood that the invention is not limited to any particular number or arrangement of audio effects, but may include other and different audio effects. In the preferred embodiment, the available audio effects are: "None," "Hall," "Large Room," and "Stadium." As is indicated on FIG. 17, the user of the apparatus 32 is informed which of these audio effects is effected by flashes of the activity LED 42a on the front of apparatus 32.

Figure 17:
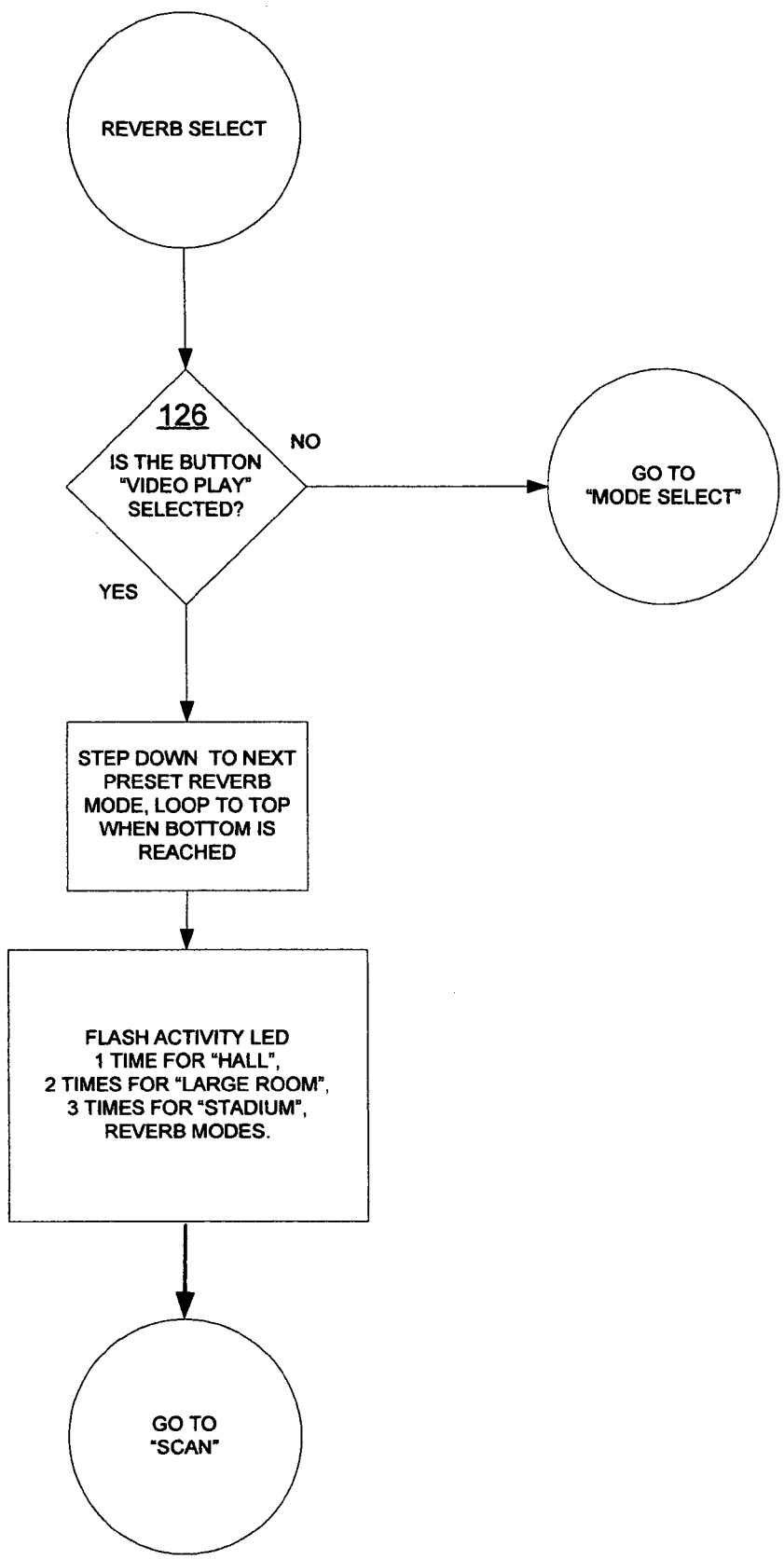
Figure 18:
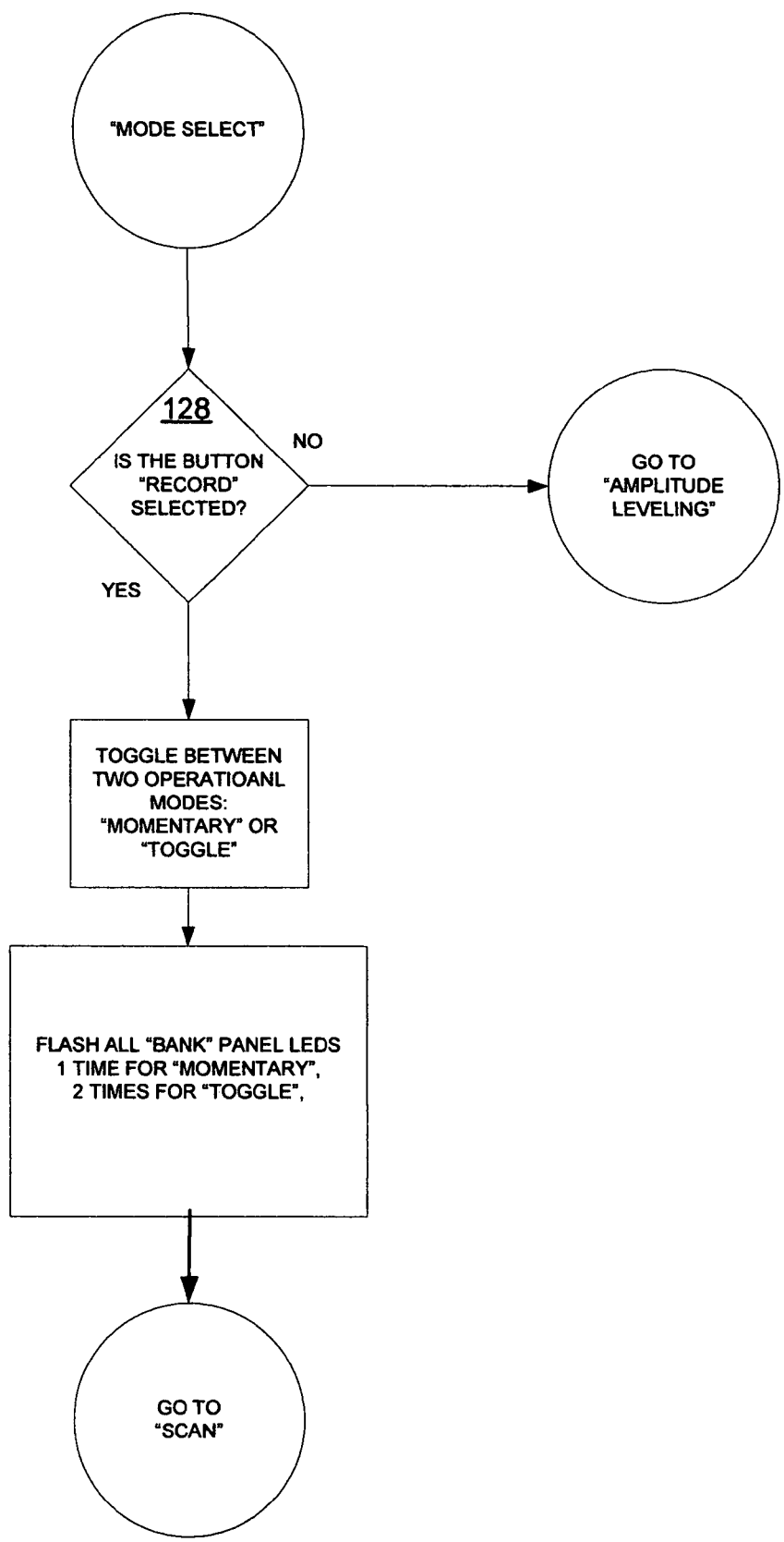

In the event that no "reverb select" function is effected during a particular scan cycle of the controller, then FIGS. 17 and 18 indicate that the controller 60 next enters a "Mode Select" control function. Viewing FIG. 18, it is seen that the "mode select" function involves a single decision cusp 128. In the event that the decision cusp 128 is implemented by the user pressing the "record" button on remote 30, then the controller 60 steps back and forth between the modes "momentary" and "toggle" which were referred to above, and explained by reference to FIG. 14.

Figure 19:
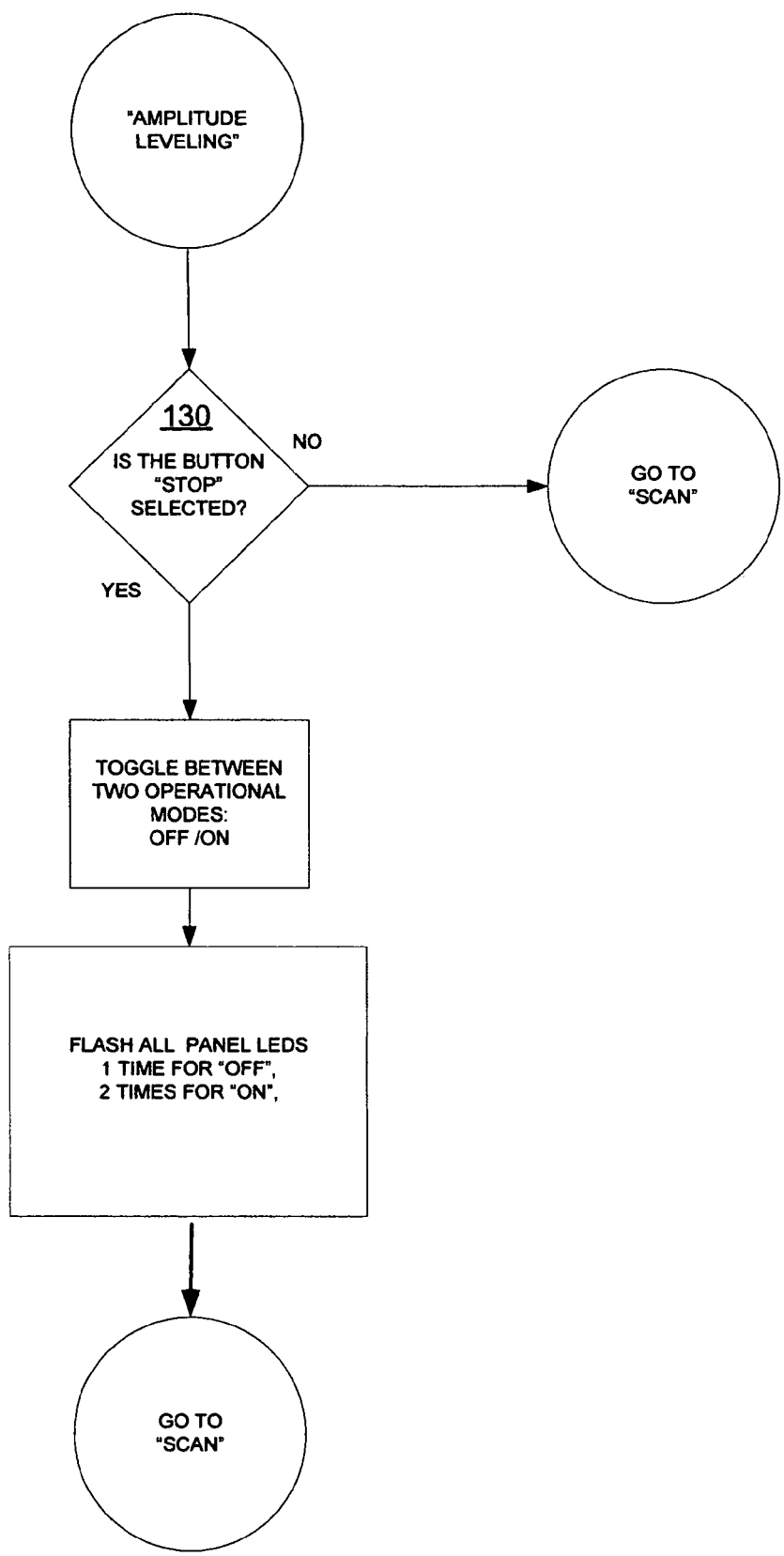

In the event that no "mode select" function is effected during a particular scan cycle of the controller, then FIGS. 18 and 19 next indicate that the controller 60 enters a "Amplitude Leveling" control function. Viewing FIG. 19, it is seen that the "amplitude leveling" function also involves a single decision cusp 130. In the event that the decision cusp 130 is implemented by the user pressing the "stop" button on remote 30, then the controller 60 toggles back and forth between "off" and "on" for the amplitude leveling function. As is indicated on FIG. 19, the user is advised of whether amplitude leveling is on or off by flashing of the indicator LED's 42.

Again, it will be understood that the apparatus 32 is not limited to the inclusion of four (4) banks of audio files, with each bank including ten (10) audio files according to this illustrated and explained exemplary preferred embodiment. That is, the arrangement and number of audio files stored in and available for playing via the apparatus 32 may vary widely dependent upon the wishes of the user. So an inventive apparatus with fewer than 40 audio files may be implemented, as may an embodiment with far greater than 40 audio files.

Those ordinarily skilled in the pertinent arts will also understand readily that the controller 60 performs its various functions with such rapidity that these functions appear to the user 28 be effected substantially instantaneous. This is the case even though each function may require the Controller 60 to execute several flow chart steps (or to execute many lines of programming code) as is seen in FIGS. 3-14. Accordingly, the user 28, and those enjoying a sporting event can supplement the experience of this home sporting event with supplemental audio content provided in a spontaneous, dynamic, and creative way by one or more of the participants at the home entertainment or home theater system 10. Importantly, the use of the apparatus 32 changes the experience of watching sports at home from a mere passive observational or watching experience, and into a participatory group experience. This change from passive observation to active participation provides for those enjoying sporting events at home an element of mutually infectious participation and enthusiasm which has never before been possible in the home environment.

Those skilled in the art will further appreciate that the present invention may be embodied in other specific forms without departing from the spirit or central attributes thereof. Particularly, the present invention may be incorporated, for example, into a television, into a VHS tape player, into a DVD player, or into a home theater system. Because the foregoing description of the present invention discloses only a particularly preferred exemplary embodiment of the invention, it is to be understood that other variations are recognized as being within the scope of the present invention. Accordingly, the present invention is not limited to the particular embodiment which has been described in detail herein. Rather, reference should be made to the appended claims to define the scope and content of the present invention.

I claim:

1. A combination home audio-visual entertainment system for providing immediately and in response to excitement and emotion experienced by a user of an audio-visual program a user-selected supplemental audio content played along with the audio portion of the audio-visual program, said home audio-visual entertainment system comprising:

a visual display unit having a display for presenting to a user the visual portion of an audio-visual program;

an audio output signal originating with the audio-visual program;

a speaker for receiving said audio signal originating with said audio-visual program and providing an audible output to the user;

an audio supplementation device receiving said audio output signal and also storing multiple supplemental audio files each having a respective address for selective mixing with said audio output signal under user control where the user always has instant single button parallel access to several audio files at once, where the selection decision of which button is pushed is a purely manual response to unfolding events and sounds of the audio-visual program as they are revealed for providing said audio signal to said speaker;

said audio supplementation device including a controller receiving and storing user input information for execution under user control in controllably mixing said audio signal and a selected one of said supplemental audio files substantially immediately and without delay in response to a user input to provide said audio signal, said controller effecting random access to any one of said multiple supplemental audio files immediately and substantially with no time delay in response to a user input command selecting said one of said multiple supplemental audio files to be immediately mixed with said audio signal, said user making said user input during the audio-visual program and thus indicating the respective address for said one supplemental audio file to be played at the immediate moment and without delay;

whereby, said audio supplementation device promotes a spontaneous dynamic environment for a user of the device in which the user may supplement the audio content of an audio-visual program during the audio-visual program by substantially instantaneously adding a selected one of said multiple audio files with a single push of a remote control button which effects the user input command and results in substantially instantaneous addition of the selected supplemental audio file to the audio content of the audio-visual program.

2. The combination home audio-visual entertainment system of claim 1 in which said audio supplementation device includes a microprocessor based controller.

3. The combination home audio-visual entertainment system of claim 2 in which said audio supplementation device includes facility for receiving input commands from a hand-held remote control.

4. The combination home audio-visual entertainment system of claim 2 in which said audio supplementation device includes facility for receiving input commands from a wireless remote control.

5. The combination home audio-visual entertainment system of claim 1 in which said audio supplementation device includes an audio mixer receiving said audio output signal and also receiving a selected one of said multiple audio files, and providing said audio signal by combining said audio output signal and said selected one of said multiple audio files under user control.

6. The combination home audio-visual entertainment system of claim 1 in which said audio supplementation device includes provision for said controller to control the relative volume level of said selected one audio file in comparison to said audio output signal.

7. The combination home audio-visual entertainment system of claim 6 in which said controller controls the relative volume level of said selected one audio file in comparison to said audio output signal from substantially a zero audio volume level at file start upwardly to a selected volume level in a selected time interval after file start, and from said selected volume level back to substantially zero volume level during a selected time interval immediately preceding file ending.

8. The combination home audio-visual entertainment system of claim 1 in which said audio supplementation device provides for operation in a "momentary" mode in which a selected audio file plays when the user presses and holds a selected button of said remote control, and the selected audio file continues playing until the user releases the pressed button; and alternatively provides for operation in a "toggle" mode in which a press and immediate release of said button on said remote control starts the selected audio file playing and the selected audio file continues playing until either the end of the file occurs, or until the user presses the same or another button on said remote control.

9. The combination home audio-visual entertainment system of claim 5 in which said device further includes a stereo digital to analog converter receiving said selected one audio file and providing to said mixer an analog conversion of said selected one audio file.

10. The combination home audio-visual entertainment system of claim 9 in which said device further includes a stereo analog reverberation effect generator, said reverberation effect generator receiving said analog conversion of said selected one audio file and providing to said audio mixer.

11. The combination home audio-visual entertainment system of claim 1 in which said device further includes a digital audio file storage apparatus receiving a removable digital storage media.

12. The combination home audio-visual entertainment system of claim 1 in which said device further includes an infrared receiving port for receiving an input command from a hand-held infrared remote control.

13. The combination home audio-visual entertainment system of claim 1 in which said device further includes an interface port selected from the group consisting of: a USB port, and an Ethernet port, whereby said interface port may be utilized to access said stored multiple supplemental audio files for addition, removal, or replacement; and may also be utilized to store and implement said user input commands in said system.

14. The combination home audio-visual entertainment system of claim 1 in which said device further includes a bank of plural indicator lamps each controlled by said controller and indicating to a user of said device the one of said multiple audio files which is selected for mixing with said audio output signal upon receipt of a user input command.

15. A home entertainment device for use in conjunction with a television providing an audio output signal originating with an audio-visual television program the visual part of which is displayed on the television for providing immediately and in response to excitement and emotion experienced by a user of the device a user-selected supplemental audio content played along with the audio portion of the audio-visual program, said home entertainment device comprising:

digital random access memory for storing a plurality of audio files;

an audio mixer for receiving said audio output signal and also receiving a selected one of said plurality of audio files, and said mixer mixing said audio signal and said selected one of said plurality of audio files to provide an audio signal to be heard by a user of the device;

a controller receiving and storing user input information for execution under user control in controllably mixing said audio signal and said selected one of said audio files to provide said audio signal, said controller effecting said mixing to provide said audio signal substantially immediately and without delay in response to a user input command made during the audio-visual program so that the user always has instant single button parallel access to several audio files at once, where the selection decision of which button is pushed is a purely manual user response to unfolding events and sounds of the audio-visual program as they are revealed for providing said audio signal to said speaker;

an audio mixer receiving said audio output signal and also receiving a selected one of said multiple audio files, and providing said audio signal by combining said audio output signal and said selected one of said multiple audio files under user control during the audio-visual program and substantially without delay in response to said user input command;

said controller controlling said audio mixer to effect the relative volume level of said selected one audio file in comparison to said audio output signal from substantially a zero audio volume level at file start upwardly to a selected volume level in a selected time interval after file start, and from said selected volume level back to substantially zero volume level during a selected time interval immediately preceding file ending;

whereby, said device promotes a spontaneous dynamic environment for a user of the device in which the user may supplement the audio content of a television program by substantially instantaneously adding a selected one of said plural audio files.

16. The device of claim 15 further including a stereo digital to analog converter receiving said selected one audio file and providing to said mixer an analog conversion of said selected one audio file.

17. The device of claim 16 in which said device further includes a stereo analog reverberation effect generator, said reverberation effect generator receiving said analog conversion of said selected one audio file and providing to said audio mixer.

18. The device claim 15 further including a digital audio file storage apparatus receiving a removable digital storage media.

19. The device of claim 15 further including an infrared receiver for receiving an input command from a hand-held infrared remote control.

20. The device of claim 15 further including an interface port selected from the group consisting of: a USB port, and an Ethernet port.

21. A method of supplementing the audio content of an audio-visual program by providing a selected one of plural supplemental audio files mixed substantially instantaneously and without delay in response to a user input command made during the audio-visual program with the audio content of the audio-visual program for providing immediately and in response to excitement and emotion experienced by the user of the audio-visual program so as to promote a spontaneous dynamic and creative environment for others also viewing the audio-visual program, said method comprising steps of:

accessing an audio output signal originating with the audio-visual program;

utilizing a speaker to receive an audio signal consisting of the output signal and a selected one of said supplemental audio files, and providing an audible output to the user;

storing said plural supplemental audio files in random access digital memory for selective mixing with said audio output signal under user control substantially instantaneously and without delay when the user provides said user input command during an audio-visual program for providing said audio signal to said speaker so that the user always has instant single button parallel access to several audio files at once, where the selection decision of which button is pushed is a purely manual user response to unfolding events and sounds of the audio-visual program as they are revealed for providing said audio signal to said speaker;

providing an audio mixer receiving said audio output signal and also receiving a selected one of said multiple audio files and combining said audio output signal and said selected one of said multiple audio files under user control;

providing a stereo digital to analog converter receiving said selected one audio file and providing to said mixer an analog conversion of said selected one audio file; and utilizing a controller to receive and store user input information for execution under user control, and enabling said controller to effect mixing of said audio output signal and a selected one of said supplemental audio files at said stereo analog mixer so as to provide said audio signal immediately and substantially without delay when the user provides said user input command during an audio-visual program, providing for said controller to effect random access to any one of said plural supplemental audio files immediately in response to a user input command selecting the one supplemental audio file that is to be mixed with said audio output signal to provide said audio signal to said speaker.

* * * * *